(12) United States Patent
Tobin et al.

(10) Patent No.: US 6,499,113 B1
(45) Date of Patent: Dec. 24, 2002

(54) METHOD AND APPARATUS FOR EXTRACTING FIRST FAILURE AND ATTENDANT OPERATING INFORMATION FROM COMPUTER SYSTEM DEVICES

(75) Inventors: Garry M. Tobin, Atkinson, NH (US); Joseph P. Coyle, Leominster, MA (US); Peter Nixon, Londonderry, NH (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/386,553

(22) Filed: Aug. 31, 1999

(51) Int. Cl.$^7$ ................................................ G06F 11/00
(52) U.S. Cl. ........................................ 714/19; 711/112
(58) Field of Search ............................ 714/19, 20, 21, 714/5, 6, 7, 8, 13, 15, 25, 30, 39, 42, 44, 48; 711/112, 114

(56) References Cited

U.S. PATENT DOCUMENTS

| | | |
|---|---|---|
| 4,375,051 A | 2/1983 | Theall |
| 4,451,886 A | 5/1984 | Guest et al. |
| 4,559,596 A | 12/1985 | Ohnishi |
| 4,660,198 A | 4/1987 | Lyon |
| 4,661,953 A | 4/1987 | Venkatesh et al. |
| 4,691,294 A | 9/1987 | Humpleman |
| 4,716,525 A | 12/1987 | Gilanyi et al. |
| 4,797,815 A | 1/1989 | Moore |
| 4,864,496 A | 9/1989 | Triolo et al. |
| 4,881,165 A | 11/1989 | Sager et al. |
| 4,912,711 A * | 3/1990 | Shiramizu .................. 371/16.1 |
| 5,072,450 A | 12/1991 | Helm et al. |
| 5,291,123 A | 3/1994 | Brown |
| 5,359,235 A | 10/1994 | Coyle et al. |
| 5,383,201 A | 1/1995 | Satterlee et al. |
| 5,406,147 A | 4/1995 | Coyle et al. |
| 5,440,729 A | 8/1995 | Kimura et al. |

(List continued on next page.)

Primary Examiner—Nadeem Iqbal
(74) Attorney, Agent, or Firm—Kurdirka & Jobse LLP (57) ABSTRACT

Information regarding the operating conditions of a computer system is stored in a storage which is dedicated to a failure management system. The storage is updated with the current operating conditions either periodically or upon the occurrence of predetermined events. When a first failure identification mechanism identifies a failure in the computer system, a capture mechanism interrupts the updating of the storage leaving information regarding operating conditions which contributed to the failure in the storage. This latter information can then be read out to aid in diagnosis of the failure. Since the operating condition information is stored in a dedicated storage, the information is not modified by events that take place after the failure is identified. In accordance with one embodiment, the computer system ordinarily holds state and other operating information in a set of storage devices, such as, for example, state registers. The dedicated storage device can be a shadow register or other shadow storage device for holding a separate dedicated copy of at least a portion of the operating information so that it is readily available in case a failure is detected. During operation, an updating mechanism continually transfers the information in the state registers to the shadow register until a first failure is detected. When a failure is detected, a capture mechanism controls the updating mechanism to cease transferring information from the state registers to the shadow register. The shadow register can then output its contents, e.g., for analysis, preferably under computer program control.

32 Claims, 6 Drawing Sheets

U.S. PATENT DOCUMENTS

| | | | |
|---|---|---|---|
| 5,450,572 A | 9/1995 | Ruedinger et al. | |
| 5,452,436 A | 9/1995 | Arai et al. | |
| 5,461,330 A | 10/1995 | Gist et al. | |
| 5,479,123 A | 12/1995 | Gist et al. | |
| 5,504,857 A * | 4/1996 | Baird et al. | 395/182.04 |
| 5,523,721 A | 6/1996 | Segawa et al. | |
| 5,534,811 A | 7/1996 | Gist et al. | |
| 5,574,866 A | 11/1996 | Smith et al. | |
| 5,592,658 A | 1/1997 | Noam | |
| 5,600,824 A | 2/1997 | Williams et al. | |
| 5,634,014 A | 5/1997 | Gist et al. | |
| 5,654,653 A | 8/1997 | Coyle et al. | |
| 5,657,456 A | 8/1997 | Gist et al. | |
| 5,680,060 A | 10/1997 | Banniza et al. | |
| 5,687,330 A | 11/1997 | Gist et al. | |
| 5,705,937 A | 1/1998 | Yap | |
| 5,734,818 A * | 3/1998 | Kern et al. | 395/182.18 |
| 5,758,113 A * | 5/1998 | Peet, Jr. et al. | 395/379 |
| 5,761,410 A * | 6/1998 | Martin et al. | 395/183.18 |
| 5,781,028 A | 7/1998 | Decuir | |
| 5,790,775 A * | 8/1998 | Marks et al. | 395/182.07 |
| 5,819,053 A | 10/1998 | Goodrum et al. | |
| 5,828,889 A * | 10/1998 | Moiin et al. | 395/728 |
| 5,928,367 A * | 7/1999 | Nelson et al. | 714/6 |
| 5,974,562 A * | 10/1999 | Townsend et al. | 714/4 |
| 6,078,979 A | 6/2000 | Li et al. | |
| 6,145,098 A * | 11/2000 | Nouri et al. | 714/31 |
| 6,275,953 B1 * | 8/2001 | Vahalia et al. | 714/11 |
| 6,363,497 B1 * | 3/2002 | Chrabaszcs | 714/13 |
| 6,233,177 B1 | 5/2002 | Shokouhi et al. | |

* cited by examiner

METHOD AND APPARATUS FOR EXTRACTING FIRST FAILURE AND ATTENDANT OPERATING INFORMATION FROM COMPUTER SYSTEM DEVICES

RELATED APPLICATIONS

The present patent application is related to the following co-pending, commonly-assigned U.S. patent applications, which are incorporated by reference herein in their entirety:

1) Ser. No. 09/387,660, entitled "Method And Apparatus For Operational Envelope Testing of Busses to Identify HALT Limits", filed on even date herewith by Joseph P. Coyle and Garry M. Tobin.

2) Ser. No. 09/386,564, entitled "Method and Apparatus for Bus Parameter Optimization Using Probes of System Configurations", filed on even date herewith by Joseph P. Coyle and Garry M. Tobin.

3) Ser. No. 09/386,563, entitled "Method and Apparatus for Programmable Adjustment of Bus Driver Propagation Times", filed on even date herewith by Garry M. Tobin and Joseph P. Coyle.

4) Ser. No. 09/386,809, entitled "Method and Apparatus for Programmable Adjustment of Bus Termination Resistance filed on even date herewith by Garry M. Tobin and Joseph P. Coyle.

5) Ser. No. 09/387,320, entitled "Method and Apparatus for Inducing Bus Saturation During Operational Testing of Busses Using a Pattern Generator" filed on even date herewith by Joseph P. Coyle and Garry M. Tobin.

6) Ser. No. 09/387,120, entitled "Method and Apparatus for Programmable Adjustment of Computer System Bus Parameters" filed on even date herewith by Garry M. Tobin and Joseph P. Coyle.

7) Ser. No. 09/386,985, entitled "Method and Apparatus for HASS Testing of Busses Under Programmable Control" filed on even date herewith by Joseph P. Coyle and Garry M. Tobin.

FIELD OF THE INVENTION

This invention relates generally to computer systems, and more particularly to identifying, capturing, isolating and diagnosing errors in computer system operation.

BACKGROUND OF THE INVENTION

As is known in the art, a computer system can take the form of a workstation, server, personal computer, network appliance or, broadly speaking, other such general-purpose digital processing device. A computer system generally includes at least one central processing unit (CPU) that is used to execute computer instructions to perform various programming functions. The CPU communicates with other devices in the computer system through an interconnection subsystem, commonly called a bus. A system bus interconnects the CPU with main memory and can also connect, directly or indirectly, other devices of the computer system to the CPU, such as chip sets, graphic adapters, memory devices, and input/output ("I/O") devices, such as keyboards, monitors, scanners and printers.

In terms of performance, computer systems have achieved in recent years dramatically higher clock speeds with lower operating voltages. Increased clock speeds, measured usually in megaHertz (MHz), can allow computer applications to run faster and data to be transferred faster between devices. Lower operating voltages can advantageously reduce power consumption, which is important, for example, in miniaturization of integrated circuits and, in mobile computing, for extending battery operating times. Unfortunately, higher clock speeds can make accurate reception of bus signals more difficult, and lower operating voltages can make signals more susceptible to errors due to lower signal-to-noise ratios and resulting signal distortion.

Transient and other non-predictable errors in the signals within the computer system can arise from other causes as well, and often have a deleterious impact on computer system performance. Such errors can arise, for example, from manufacturers' defects in devices connected in or to the computer system, as well as degradation over time of such devices. Errors can also arise due to non-compatibility of add-on components of the computer system, such as I/O devices and adapter cards, which are integrated into the computer system by customers, e.g., through "plug and play" operation. Where such devices malfunction, or simply exhibit operating parameters unanticipated by the original computer manufacturer, errors can arise. Such errors can result in lost or corrupted data, and, in extreme cases, such errors can cause system crashes.

Conventionally, the way to capture and isolate such errors has been through re-running the computer application during which the errors arose, with the devices instrumented to identify the errors, and provide error-related information to an external logic analyzer. An object of this approach is to identify the specific device that initially caused an error, i.e., that was responsible for the first occurrence of the error, also known as "first failure". One difficulty with this approach lies in differentiating the first failure from other effects of the errors as they propagate through downstream devices of the computer system. Another drawback of this approach is that the instrumentation added to the devices for monitoring operation can affect the system, and even temporarily hide or modify a failure condition. Additional drawbacks include labor, downtime, and other costs related to the attachment of hardware instrumentation and the use of the external logic analyzer. It would be desirable to provide a technique for enabling errors arising in computer systems to be identified, captured, isolated, and diagnosed using a technique that overcomes at least a number of the difficulties of conventional approaches.

SUMMARY OF THE INVENTION

In accordance with the principles of the invention, in a failure management system, information regarding the operating conditions of a computer system is stored in a storage, which is dedicated to the failure management system. The storage is updated with the current operating conditions either periodically or upon the occurrence of predetermined events. When a first failure identification mechanism identifies a failure in the computer system, a capture mechanism interrupts the updating of the storage, leaving information regarding operating conditions which contributed to the failure in the storage. This latter information can then be read out to aid in diagnosis of the failure. Since the operating condition information is stored in a dedicated storage, the information is not modified by events that take place after the failure is identified.

More specifically, the computer system ordinarily holds state and other operating information in a set of storage devices, such as, for example, state registers. The dedicated storage device can be a shadow register or other shadow storage device for holding a separate dedicated copy of at least a portion of the operating information so that it is readily available in case a failure is detected. During operation, an updating mechanism continually transfers the information in the state registers to the shadow register until a first failure is detected. For example, this transfer can be carried out periodically or when the information in the state registers changes. When a failure is detected, a capture mechanism controls the updating mechanism to cease transferring information from the state registers to the shadow register. The shadow register can then output its contents, e.g., for analysis, preferably under computer program control.

The first failure management system can be implemented in a computer system. Conventional computer systems have a set of registers or other storage components for holding state information regarding execution of computer programs, and error flags of one or more bits indicative of error conditions. Computer systems can also be equipped with other storage components for holding other system information, such as, e.g., temperature within the computer's housing, which may be useful to diagnose system operating errors. The first failure management system can include error logic responsive to the error flags from the storage components for generating a first failure indicating signal, which can be provided as an error notification signal output. The first failure management system can also include a shadow register chain, history queue or other shadow storage locations. The shadow storage locations receive a copy of at least a portion of the operating and error information from the storage components, and store that copy so that it is available in case of an error condition.

The control signal to which the shadow storage devices are responsive can be a special clock signal, for example, which controls shifting of the shadow register or overwriting of the history queue, so as to continue updating of the contents of that register or queue for so long as no error is detected. Upon error detection, the capture mechanism discontinues the clock signal, freezing the contents of the shadow register until such time that the contents can be provided as an output from the operating information capture mechanism.

Responsive to a control signal indicative of a first failure error, a scan controller can extract that information from the shadow storage locations and provide it as an output from the operating information capture mechanism. The scan controller can be implemented, e.g., as a service processor. A service processor is a processor that can scan the operating information in the shadow register chain and either provide that information as an output or execute an error-analysis program.

Accordingly, the invention can be used in identifying, capturing, isolating, notifying and diagnosing an error constituting the first failure in the system, and thus differentiating the first failure from other effects of that error as it may propagate through downstream devices of the computer system. The invention does not require the attachment of instrumentation or an external error analyzer because these components are preferably built into the system. Essentially, instrumentation implementing the invention can be formed directly on the same logic chip as the device that it is monitoring. Moreover, the invention can be used in automatically providing operating information, including the computer's state as of the error condition, with significantly less labor, downtime, costs and untoward effects associated with prior art attachment of hardware instrumentation and the use of an external logic analyzer.

BRIEF DESCRIPTION OF THE DRAWINGS

The above and further advantages of the invention may be better understood by referring to the following description in conjunction with the accompanying drawings in which.

DETAILED DESCRIPTION OF THE PREFERRED EMBODIMENT

A) Electronic System

Figure 1:
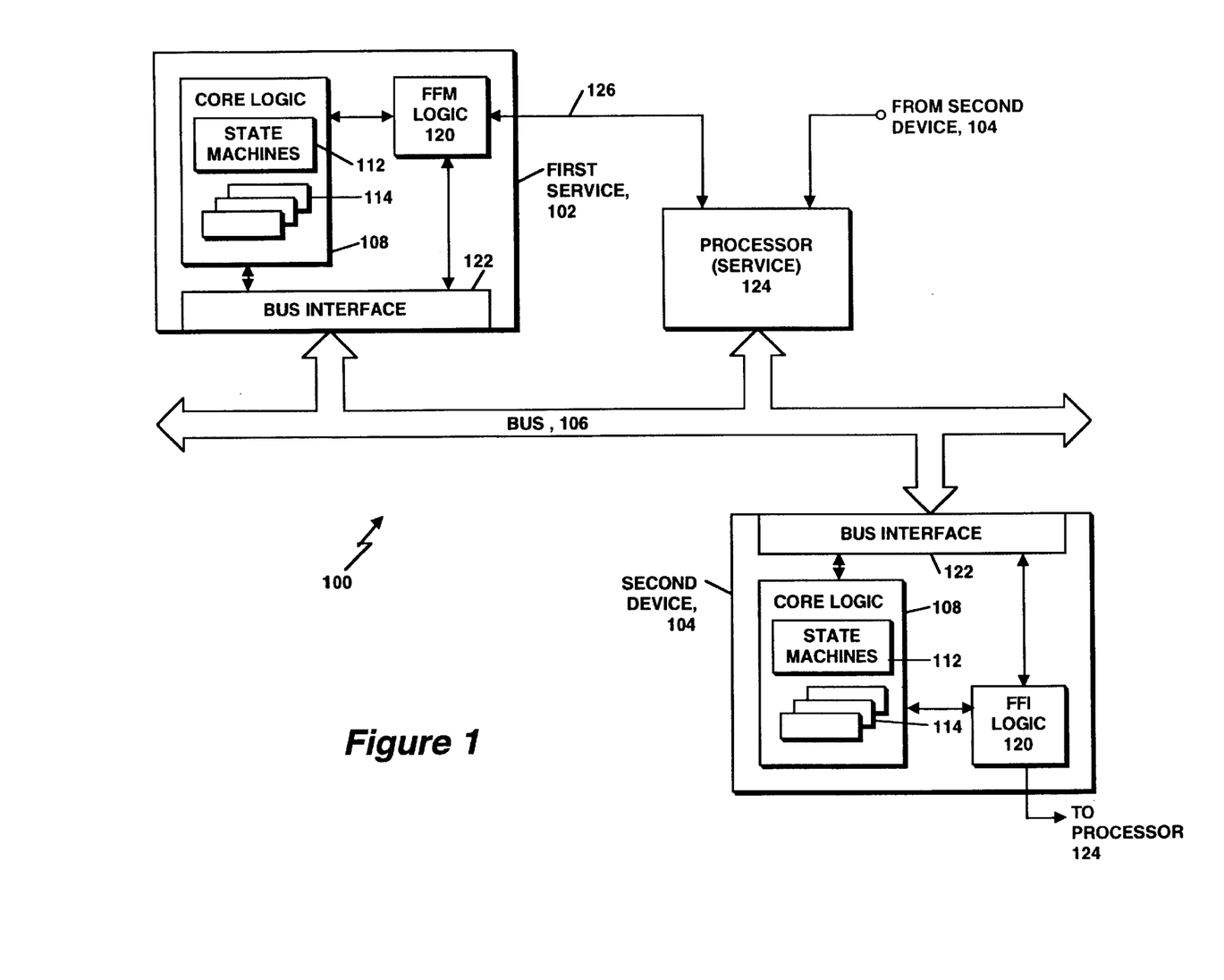
FIG. 1 is a block diagram of an electronic system having first and second functional devices and a service processor in accordance with an embodiment of the invention.

FIG. 1 shows an electronic system 100 having first and second devices 102, 104 interconnected by a bus 106. While only two such devices are shown for illustrative purposes, the invention can be implemented with any practical number of such devices. The electronic system 100 can be, for example, a computer system, such as, e.g., a workstation, server, or personal computer. The electronic system 100 can also be, for example, a communication device such as a cellular phone, or even, foreseeably, a video game console, entertainment system, or other electronic apparatus or instrument having a processor (such as a microprocessor or digital signal processor) or controller. Alternatively, the electronic system 100 can comprise a network of computer systems or other network-capable electronic apparatus or instruments, which are interconnected by a communication channel, which will be referred to herein as a bus.

For ease of explanation, the devices 102, 104 are shown as containing the same components. Each device 102, 104 has conventional core logic 108 for performing the respective device's intended functions. For example, where the electronic system 100 is a computer system, the devices 102, 104 can be, e.g., a CPU and a memory module, and the core logic 108 of each can be responsible, respectively, for processing and storing computer program instructions and data. The core logic 108 can include, for example, one or more conventional state machines 112 and a plurality of conventional registers 114 for storing state and other information in the typical manner of conventional computer systems. Each device 102, 104 also includes novel, first failure management (FFM) logic 120, for detecting a first failure condition as it occurs in the device and capturing state and other information from the state machines 112 and registers 114 for use in analyzing, diagnosing and correcting the condition. More specifically, the state machines 112 and registers 114 can cooperate with the FFM logic 120 to make available bus, state, status, temperature, and other operating information for use in error analysis. A bus interface 122 connects the core logic 108 and FFM logic 120 to the bus 106 for communication, e.g., with a processor 124, which performs the aforementioned analysis, and with the other of the devices 102, 104. Alternatively, the information from the FFM logic 120 can be provided to the processor 124 over a dedicated link 126, for example, in accordance with the JTAG Spec.

The term "JTAG Spec," as used herein, refers to the "JTAG Specification, as set forth in IEEE 1149.1-1990, Standard Test Access Port and Boundary-Scan Architecture ("JTAG Spec"), which is incorporated herein by reference, and available from IEEE, 3 Park Avenue, 17$^{th}$ Floor, NY, N.Y., 10016-5997, USA.

Accordingly, once an error condition is detected, the operating information, as made available by the state machines 112 and registers 114, is captured in the FFM logic 120 which maintains a copy of the operating information in a storage dedicated to the FFM logic 120. While the registers 114 of the core logic 108 will update their contents in the usual manner often in disregard of the error condition, the FFM logic 120 responds to an indication of the occurrence of an error within the system by statically holding its copy of the operating information until that information can be extracted by the service processor 124. Thus, in summary, the FFM logic 120 is responsible for detecting the error condition, retaining the attendant operating information, and providing that information to the service processor 124. The FFM logic 120 can also provide an error notification signal, e.g., to a computer operator or computer system administrator, to inform that individual of the error.

Figure 2A:
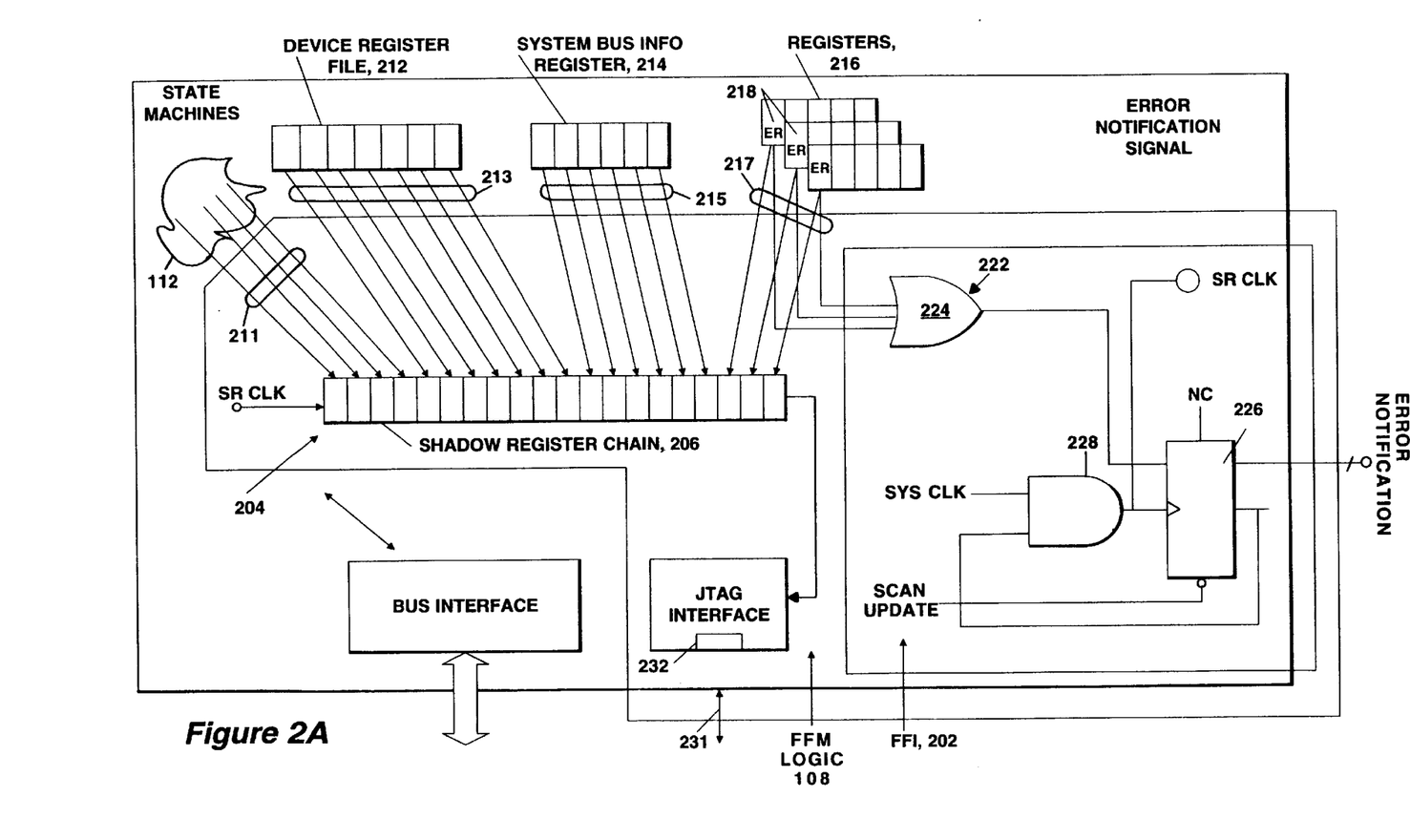
FIG. 2A is a representation, partially in block diagram form and partially in schematic form, of an exemplary one of the devices of FIG. 1, showing details of the first failure management (FFM) logic in accordance with an embodiment of the invention.

FIG. 2A shows a representative embodiment of one of the devices 102, 104 in greater detail with respect to the FFM logic 120. The FFM logic 120 is depicted as including a first failure identification (FFI) logic module 202, in the form of electronic circuitry, and a dedicated storage device 204, e.g., in the form of a shadow register chain 206. It should be understood that the invention can be implemented in various alternative fashions, for example, the FFI logic 202 can be implemented in software, firmware and/or hardware, and the shadow storage device 204 can be implemented using any suitable storage device, such as electronic memory, a stack of registers, etc., depending on the application.

A number of different devices within the computer system can provide operating information to the shadow register chain 206. These sources can include the state machines 112 as shown in FIG. 2A, which provide data to the shadow register chain 206 regarding their current state. Likewise, these sources can include registers 114, such as, for example, a device register file 212, a system bus information register 214, and other registers 216 containing error flags, which can provide data to the shadow register chain 206 about state and other operating conditions. The error flags of the registers 216 can be, for example, single-bit locations 218 that individually assume a first binary value (e.g., ONE) to indicate an error condition and otherwise have a different, second binary value (e.g., ZERO). Individual error flags can also comprise a plurality of bits. The error condition can be any sort of error or fault, such as, for example, a parity bit error or a protocol violation (e.g., missing acknowledgement signal during messaging, or addressing error indicative of non-existent resource).

The information in state machines 112 is transferred to shadow register chain 206 by means of an update mechanism schematically illustrated by arrows 211. Similarly, the information in devices registers 212, system bus info register 214 and registers 216 is transferred to shadow register chain 206 by means of an update mechanism schematically illustrated by arrows 213, 215 and 217, respectively. The update mechanisms could consist of logic (part of core logic 108, not shown) which applies the outputs of the registers 112, 212, 214 and 216 to stages in shadow register chain 206 under control of a clock signal or other occurrence.

Alternatively, the registers 112, 212, 214 and 216 can be connected to respective stages in shadow register chain 206 and the updating or transfer of information controlled by clocking or enabling the shadow register chain 206 stages at appropriate times. In this case, the control signal to which the shadow storage stages are responsive can be a special clock signal, for example, which controls shifting of the shadow register or overwriting of the history queue, so as to continue updating of the contents of that register or queue for so long as no error is detected. In FIG. 2A, this control signal is generated by gate 228 under control of the system clock, SYS CLK.

The FFI logic 202 cooperates with the shadow register chain 206 to provide a first failure capture mechanism that captures the operating information, which is useful, e.g., to isolate a transient error. The FFI logic 202 causes the shadow register chain 206 to continually capture new operating information until an error is detected, whereupon it causes the shadow register chain 206 to stop capturing any new information subsequent to the detected error. In other words, upon a detected error, the FFI logic 202 controls the update mechanism to stop or interrupt the "updating" of the shadow register chain operating information so that the shadow register chain 206 retains the operating information attendant to the detected error.

A way to implement this aspect of the invention is to have the core logic 108 continually scan the state machines 112 and registers 114, and transfer the state and register contents in the shadow register 206, with the concomitant shifting out of its prior contents, which can be discarded. Upon detection of an error condition, the scanning is interrupted and the shadow register contents frozen until its contents can be read out by the service processor 124.

The FFI logic 202 includes error logic 222 for receiving the error flags from the single-bit locations 218 of the registers 216, and, if any of the error flags have the error-indicating first value, producing an error identification signal to indicate a first failure event. The error logic 222 can be implemented as an OR gate 224, having the bits from the error flags applied to individual input terminals thereof, and, if any indicate an error, producing the error identification signal on its output terminal.

The error identification signal is applied to a capture mechanism which includes gate 228 and latch 226. In particular, the error identification signal is applied to an input terminal of a latch 226, whose output is an Error Notification signal. The latch 226 is clocked by a clock signal formed by an AND gate 228. The output of the AND gate 228 is also used as the clock signal, called SR clock, for the shadow register chain 206. The AND gate 228 receives a system clock at a first input terminal and a feedback signal from the output of the latch 226 at a second input terminal. Upon the Error Notification signal goes positive to indicate an error, the feedback signal blocks the AND gate from producing a positive clock output. Since the SR clock is effectively stopped, the shadow chain register 206 retains (i.e., freezes) its contents and stops updating it with subsequent new operating information. A scan update signal applied to a reset terminal of the latch 226 can re-arm the FFI logic 202.

Alternatively, the error identification signal could be applied to a capture mechanism (not shown) in the core logic 108 which, in turn, causes the core logic to interrupt transfer of information from the registers 112, 212, 215 and 217 to the shadow register chain 206.

Thus, the error flags are logically OR'ed together, and can cause freezing of operating information in the shadow register chain and/or the assertion of an error signal upon any of the error flags indicating an error condition. The error signal can be used, e.g., as an interrupt in the system or, e.g., can be applied to a dedicated "error event" pin out for notification to the system.

In this exemplary embodiment, the error notification signal can be sent to the service processor 124 (FIG. 1), which can cause the contents of the shadow register chain 206 to be emptied, e.g., serially, via a JTAG interface 230. The contents can then be provided over link 231 to the service processor 124 for analysis of the detected error condition. The JTAG interface 230 can include a JTAG controller 232 in compliance with the JTAG Spec. The JTAG controller 232 is responsive to a digital control signal generated, e.g., by a computer program implemented in compliance with the JTAG Spec and executed, for example, by the service processor 124.

Figure 2B:
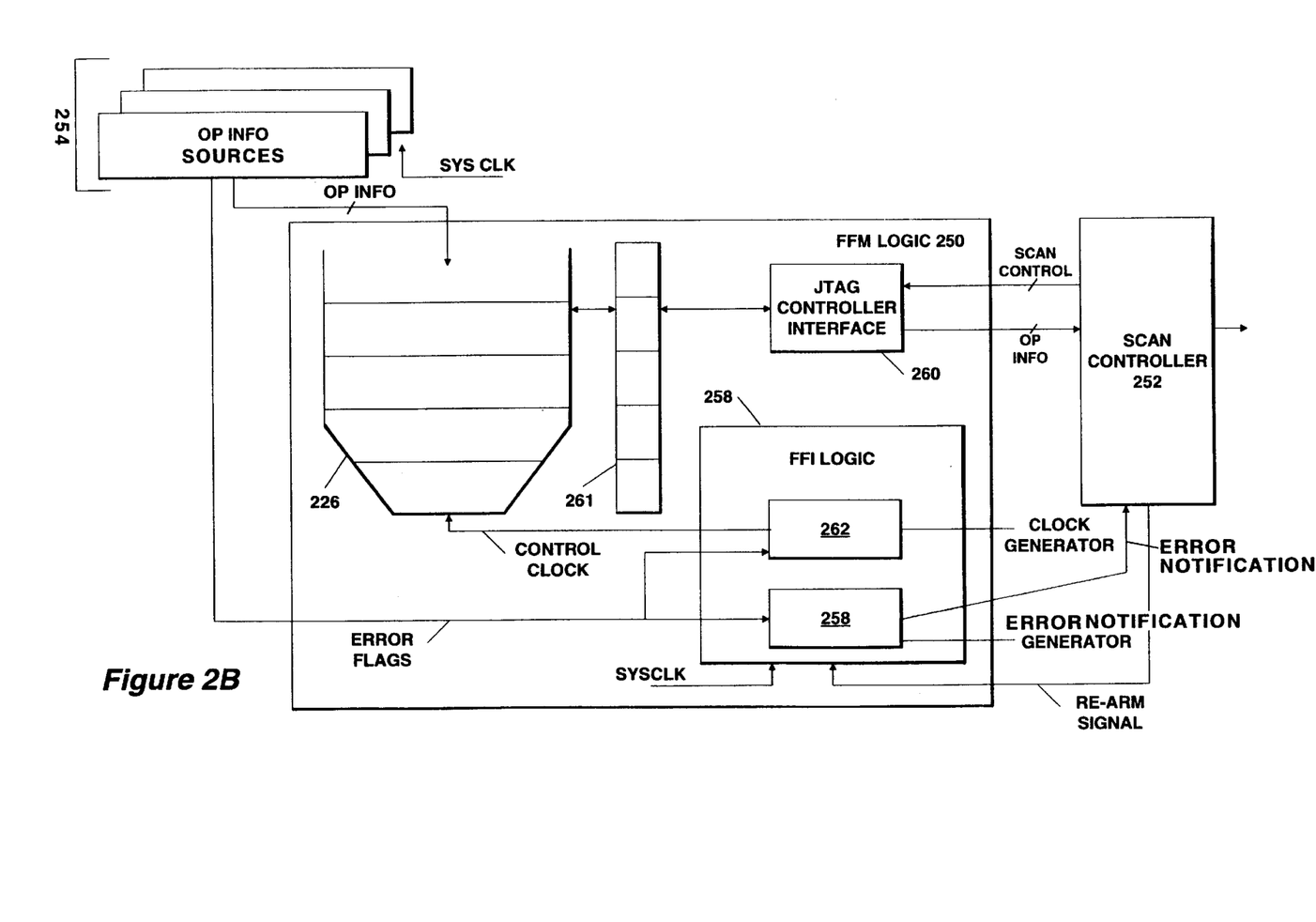
FIG. 2B is a representation, partially in block diagram form and partially in schematic form, of an alternative embodiment of the FFM logic and a scan controller in accordance with the invention.

FIG. 2B shows an alternative embodiment of FFM logic 250 under the control of a scan controller 252 in accordance with the invention. A plurality of operating information sources 254 are coupled to the FFM logic 250 to provide both operating information, including, for example, state and other information useful in diagnosing an error condition, as well as error flags that indicate whether an error condition has occurred. Collectively, this information can also be called the error-related operating information (EROI). The EROI is updated from time to time, e.g., as the state and other operating information changes or as this information is polled and provided to the operating information sources. Thus, each updated version of EROI is associated with a particular system clock cycle when the information is provided to the FFM logic 250.

The FFM logic 250 includes a history queue 256 for storing each successive version of the EROI at a different entry thereof so as to contain essentially a history of the EROI, e.g., including a history of system state and other information. As updated EROI continue to be added to the history queue 226, it becomes filled, and, then, prior entries may be overwritten with subsequent EROI versions.

The FFM logic 250 also includes FFI logic 258 and a JTAG controller/interface 260. The FFI logic 258 has an error notification generator 258 and a clock generator 262. The error notification generator 258 is responsive to the error flags for providing an error notification signal to the scan controller 252. The clock generator 262 is responsive to the error flags and the system clock (SYS CLK) for providing a control signal, e.g., a control clock, indicative of an error condition for stopping or freezing over-writing of queue entries. The FFI logic 258 can be implemented, for example, as shown at reference number 202 in FIG. 2A. The JTAG controller/interface 260 is responsible for scanning out, via a scan register 261, one or more queue entries under the control of the scan controller 252.

Accordingly, the scan controller 252, in response to the error notification signal from the FFI logic 258, (a) provides the JTAG controller/interface 260 with a scan control signal, and (b) receives EROI from one or more queue entries via the JTAG controller/interface 260. The scan controller 252 can cause the JTAG controller/interface to extract only the most current EROI entry as of the time that an error condition was detected, or a history of EROI including, e.g., one or more prior EROI entries and possibly subsequent entries. After receiving the desired EROI entries, the scan controller 252 can send the FFI logic 258 a re-arm signal to reset its logic, whereby the control clock unfreezes the history queue 226 causing it to continue receiving new EROI versions, and the error notification generator 258 awaits a next error condition.

Figure 3:
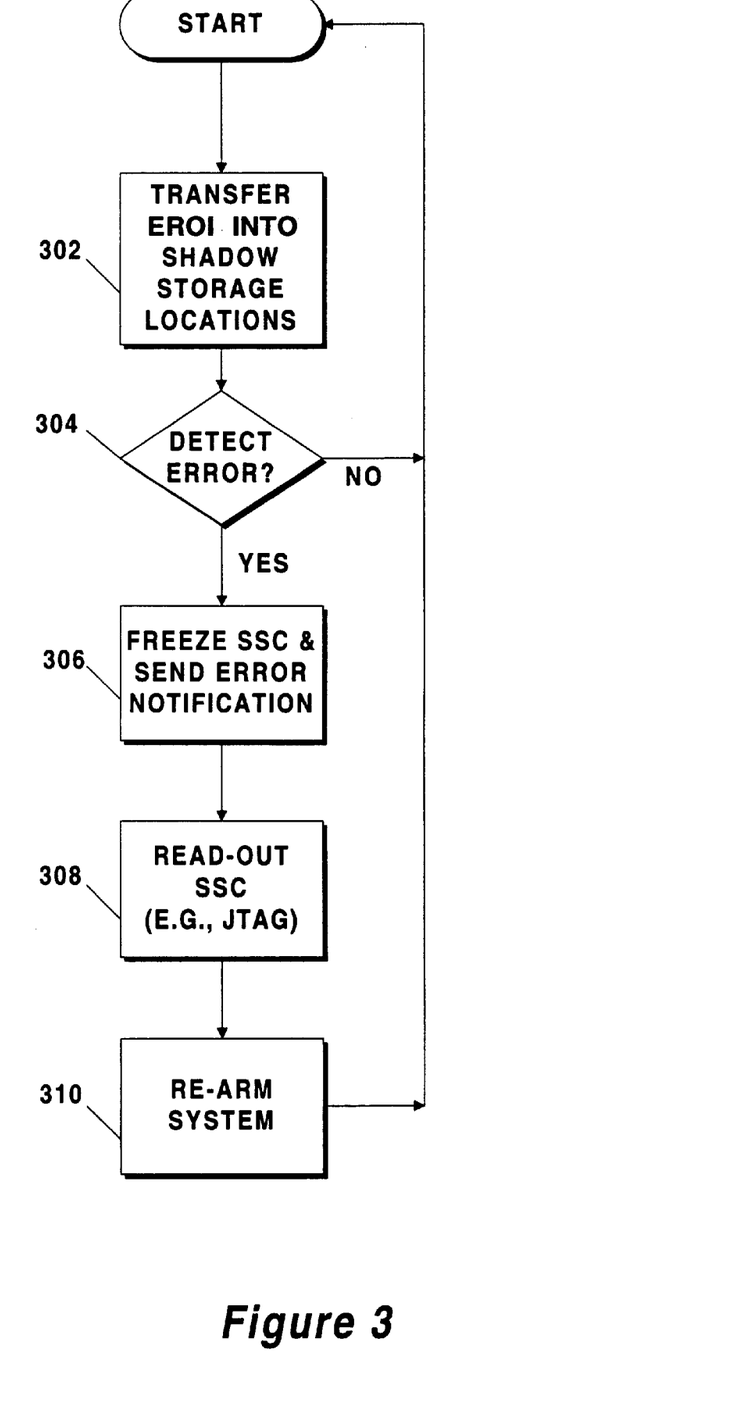
FIG. 3 is a flow chart of a method of first failure management in accordance with an embodiment of the invention.

FIG. 3 illustrates a method 300 of implementing the invention according to an exemplary embodiment.. The method 300 starts in block 302 with the transfer of a copy of EROI into the shadow scan register, history queue or other storage locations from other devices within the electronic system, such as, for example, device registers. In block 304, the method 300 tests error flags in the system to detect whether an error condition is indicated. If no error is detected, the method 300 returns to step 302. If an error is detected, the method 300 in block 306 freezes the shadow storage location contents ("SSC") so as to preserve the EROI contained therein and sends an error notification signal to a scan controller or processor. Then, in block 308, the method 300 reads out the SSC of the shadow storage locations, which can comprise, e.g., EROI version(s) attendant to the detected error condition. For these purposes, the method 300 can, for example, use JTAG techniques under computer program control to provide the information to a processor for analysis. Then, after attending to the error condition in an appropriate way, in block 310, the method 300 re-arms the system and continues in block 302, as described above.

Figure 4:
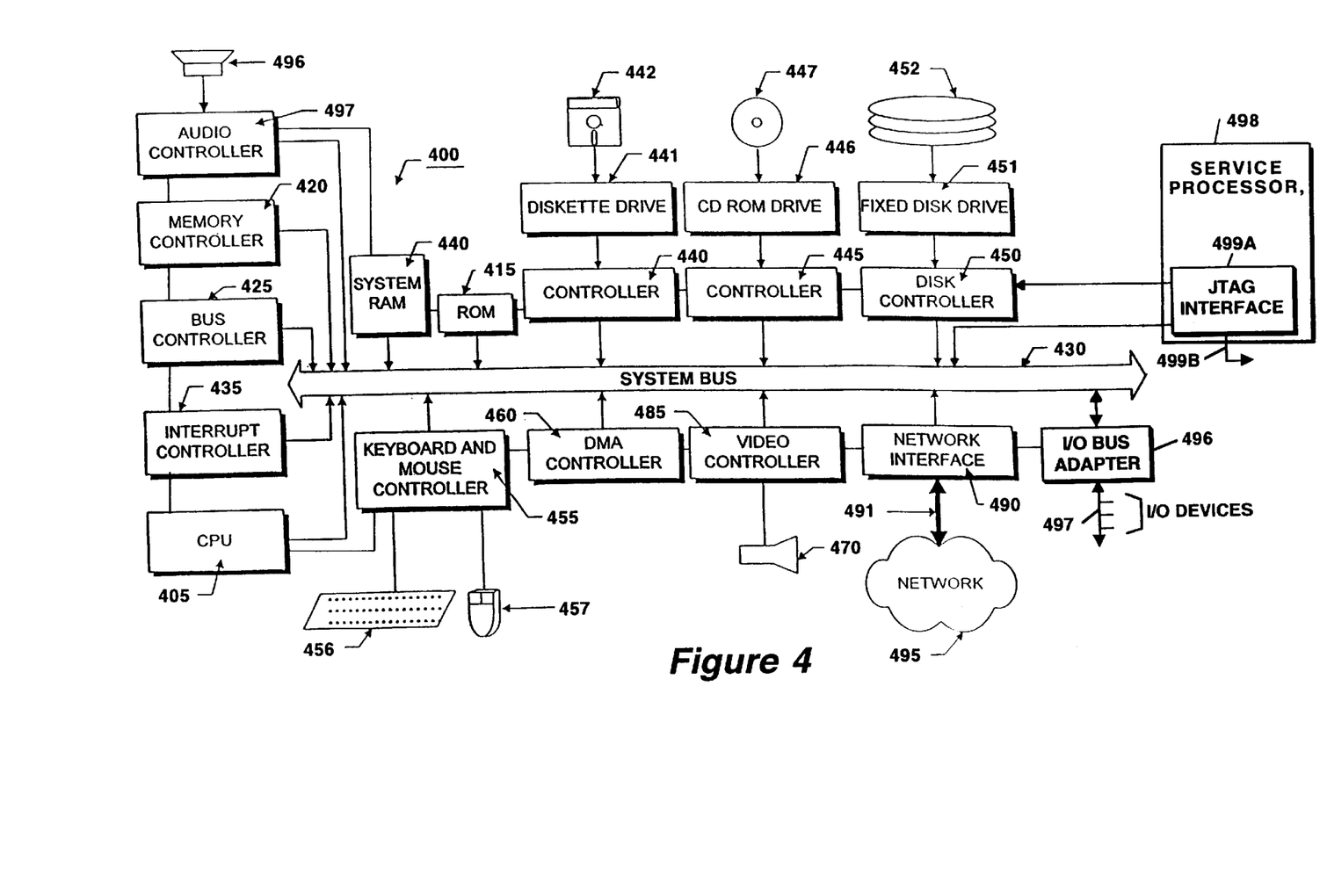
FIG. 4 is a block diagram of an illustrative embodiment of a computer system having the service processor of FIG. 1.
Figure 5:
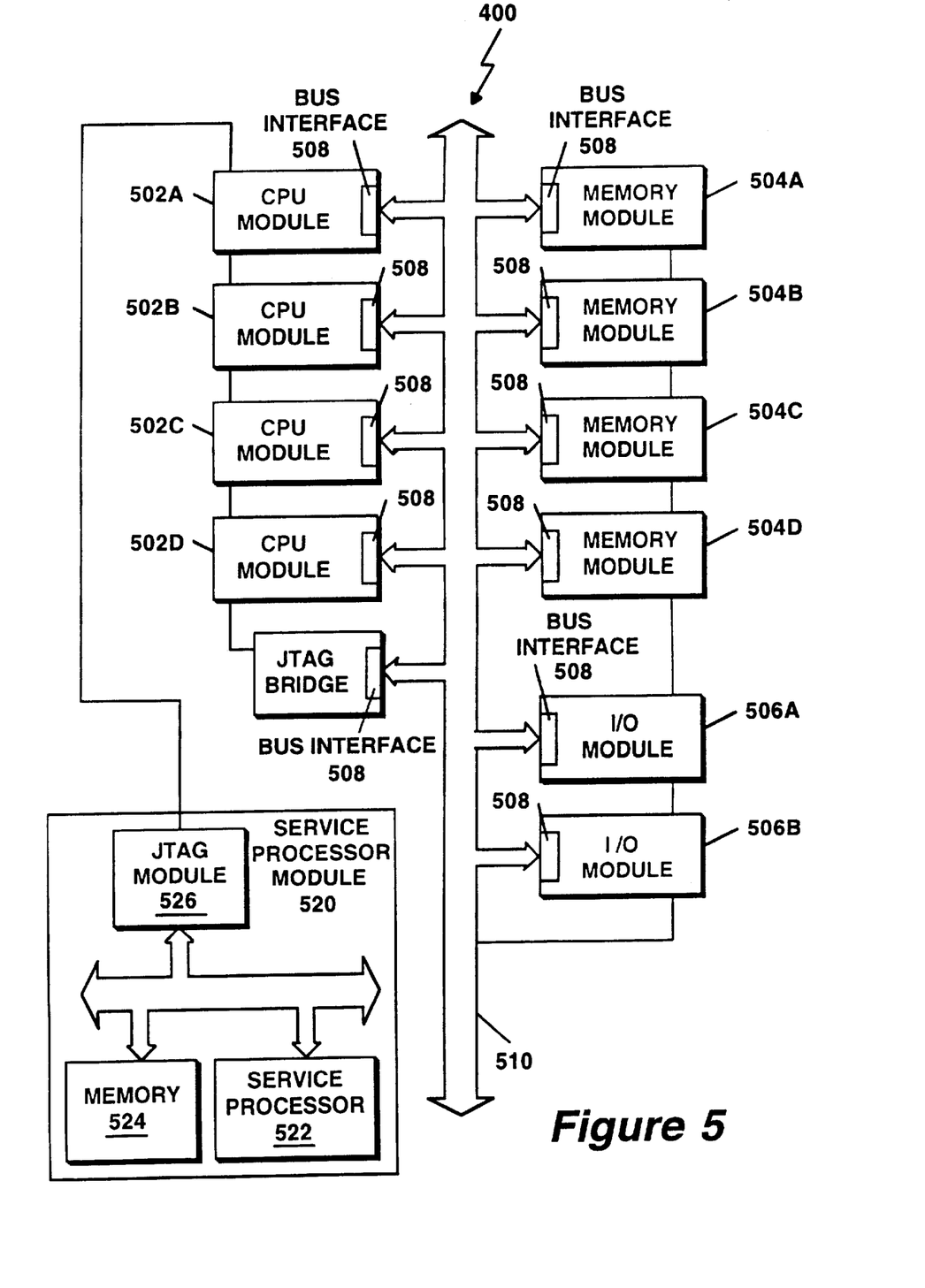
FIG. 5 is a block diagram of an illustrative embodiment of a multiprocessor computer system in which the invention can be practiced.

As noted above, the service processor 124 used for analysis of the EROI need not be a service-dedicated computer system. It can also be a general-purpose computer system, such as that used for general system administration, which should also receive the error notification signal so as to alert the system administrator, e.g., by a visual or audio display of an error alert. FIG. 4 shows a computer system 300, which can implement the service processor 124. Moreover, as noted above, the electronic system 100 of FIG. 1 can take the form of a computer system, such as that shown in FIG. 4. It should be understood at the outset that the service processor (or for that matter the electronic system of FIG. 1 when embodied as a computer) can be implemented in any of a great variety of computer architectures, including both single-processor designs such as that shown in FIG. 4 and multiprocessor designs such as that shown in FIG. 5. In addition, the invention can be practiced in other forms of intelligent devices, in which the invention can be advantageously employed. Such other intelligent devices may include network devices, such as bridges and gateways, and communication devices, to name a few. Moreover, the single-processor computer system shown in FIG. 4 and the multiprocessor computer system shown in FIG. 5 are discussed only for illustrative purposes, and their specific layout and design should not be considered a limitation of the invention. Although the description below may refer to terms commonly used in describing particular computer systems, the described concepts apply equally to other computer systems, including systems having architectures that are dissimilar to that shown in FIGS. 4 and 5.

In FIG. 4, the computer system 400 includes a central processing unit (CPU) 405, which may include a conventional microprocessor, random access memory (RAM) 410 for temporary storage of information, and read only memory (ROM) 415 for permanent storage of information. A memory controller 420 is provided for controlling system RAM 410. A bus controller 425 is provided for controlling system bus 430, and an interrupt controller 435 is used for receiving and processing various interrupt signals from the other system components.

Mass storage may be provided by diskette 442, CD-ROM 447, or hard disk 452. Data and software may be exchanged with computer system 400 via removable media, such as diskette 442 and CD-ROM 447. Diskette 442 is insertable into diskette drive 441, which is connected to system bus 430 by controller 440. Similarly, CD-ROM 447 is insertable into CD-ROM drive 446, which is connected to system bus 430 by controller 445. Finally, the hard disk 452 is part of a fixed disk drive 451, which is connected to system bus 430 by controller 450.

User input to and output from the computer system 400 may be provided by a number of devices collectively constituting an I/O subsystem. For example, a keyboard 456 and a mouse 457 may be connected to a system bus 430 by keyboard and mouse controller 455. An audio transducer 496, which may act as both a microphone and a speaker, is connected to bus 430 by audio controller 497. It should be obvious to those reasonably skilled in the art that other input devices, such as a pen and/or tablet and a microphone for voice input, may be connected to computer system 400 through bus 430 and an appropriate controller. DMA controller 460 is provided for performing direct memory access to system RAM 410. A visual display is generated by a video controller 465, which controls video display 470. Where the computer system 400 is a server, the foregoing I/O devices may be part of the system only when needed for system monitoring, upgrading or servicing.

Computer system 400 also includes a network adapter 490 that allows the computer system 400 to be interconnected to a network 495 via a bus 491. The network 495, which may be a local area network (LAN), a wide area network (WAN), or the Internet, may utilize general-purpose communication lines that interconnect multiple network devices.

Moreover, the computer system 400 can include an I/O bus adapter 496 connected between the system bus 430 and an I/O bus 497 for communication between components connected to the system bus and one or more I/O devices connected to the I/O bus. The I/O bus adapter 496 typically is a node on each of the buses 430, 497, and serves to convert signals on one of the buses intended for devices on the other into signals having the appropriate protocol and addressing for their destination.

The system bus 430, network bus 491, and I/O bus 497 are collectively referred to herein for convenience as the "computer buses", a term intended to a encompass not just these named buses, but also any and all buses implementable in a computer system, including switched network interconnects. The computer buses can each include address, control, and data lines for communication via the particular bus protocols with which each complies. Each of the devices that is connected to any of the computer buses includes a bus interface (not separately shown in this figure) for driving and receiving signals over the bus in accordance with its bus protocol. Additionally, the computer system 400 can include a service processor 498. The service processor 498 has a JTAG interface 499A, which communicates over a dedicated JTAG link 499B with other devices connected thereto.

Computer system 400 generally is controlled and coordinated by operating system software, such as the SOLARIS™ operating system (available from Sun Microsystems, Palo Alto, Calif., USA). Among other computer system control functions, the operating system controls allocation of system resources and performs tasks such as process scheduling, memory management, networking and I/O services.

In FIG. 5, the multiprocessor computer system 500 is shown as including four CPU modules 502A–D, four memory modules 504A–D, and two I/O modules 506A–B. The exact number of each of these devices is used merely for purposes of illustration and other computer system implementations may include a greater or lesser number of these devices. Each of the modules 502A–D, 504A–D, and 506A–B includes a bus interface 508 for connecting their respective module to a system bus 510. The system bus 510 can be, for example, implemented as a network containing a point-to-point switching fabric. The interfaces 508 contain logic for driving and receiving signals over the system bus 510 in accordance with its bus protocol, preferably implemented as an integrated circuit, (IC). Moreover, each module 502A–D, 504A–D, and 506A–B can be implemented as a separate application specific integrated circuit ("ASIC") containing the interface 508.

FIG. 5 also shows a service processor module 520 for managing service-related activities for the computer system 500. The service processor module 520 includes a service processor 522 for executing programs, such as software, a memory 524 for storing data and programs, and a JTAG module 526, which can implement the JTAG interfaces 706, for example, under the control of the service processor 522. The service processor module 520 can be implemented as a computer system, having the components discussed above in conjunction with FIG. 4.

A software implementation of components of the above-described embodiment may comprise computer instructions and routines either fixed on a tangible medium, such as a computer-readable media, e.g. the diskette 442, CD-ROM 447, ROM 415, or fixed disk 452 of FIG. 4, or transmittable via a modem or other interface device, such as communications adapter 490 connected to the network 495 over a medium 491. Medium 491 can be either a tangible medium, including but not limited to optical or hard-wire communications lines, or may be implemented with wireless techniques, including but not limited to microwave, infrared or other transmission techniques. It may also be the Internet. A series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Though an exemplary embodiment of the invention has been disclosed, it will be apparent to those skilled in the art that various changes and modifications can be made which will achieve some of the advantages of the invention without departing from the spirit and scope of the invention. Moreover, it will be obvious to those reasonably skilled in the art that other components performing the same functions may be suitably substituted. Further, the methods of the invention may be achieved in either all software implementations, using the appropriate processor instructions, or in hybrid implementations that utilize a combination of hardware logic and software logic to achieve the same results, or in hardware and firmware implementations. Further, aspects such as the size of memory, the specific configuration of logic and/or instructions utilized to achieve a particular function, as well as other modifications to the disclosed embodiments and the inventive concept are intended to be covered by the appended claims.

What is claimed is:

1. A first failure management system for an electronic device having a plurality of devices interconnected by a bus, the system comprising:
   a storage dedicated to the management system which stores information regarding operating conditions of the electronic device;
   an updater which updates the information in the storage;
   an identifier which identifies a first failure in a device of the electronic device; and
   a capture mechanism which responds to a first failure identified by the identifier by interrupting the updating of information so that information regarding operating conditions which contributed to the first failure is retained in the storage.

2. The first failure management system in accordance with claim 1 wherein the storage comprises a register.

3. The first failure management system in accordance with claim 1 wherein the electronic device comprises a memory and the storage comprises selected locations in the memory.

4. The first failure management system in accordance with claim 1, wherein the updater periodically updates information in the storage.

5. The first failure management system in accordance with claim 1 wherein the updater updates information in the storage upon the occurrence of a predetermined event.

6. The first failure management system in accordance with claim 1, wherein the electronic device comprises a electronic device, and the electronic device further includes a plurality of registers which hold electronic device state information and wherein the updater transfers the state information from the registers to the storage.

7. The first failure management system in accordance with claim 6 wherein the storage comprises a shadow register and the updater transfers the state information from the registers to the shadow register.

8. The first failure management system in accordance with claim 6, wherein the updater transfers information from a plurality of device register files to the storage.

9. The first failure management system in accordance with claim 6, wherein the updater transfers information from a system bus information file to the storage.

10. The first failure management system in accordance with claim 6 wherein the capture mechanism controls the updater to stop transfer of the state information from the registers to the storage when a failure is detected.

11. The first failure management system in accordance with claim 1, wherein the electronic device comprises a computer system, and the computer system has a plurality of storages, each holding operating information including an error indicating flag, and wherein the identifier is connected to each of the plurality of storages for generating a first failure indicating signal responsive to the error indicating flags.

12. The first failure management system in accordance with claim 1, further including a readout mechanism which reads information regarding operating conditions which contributed to the first failure from the storage to an output terminal.

13. The first failure management system in accordance with claim 10, further including a service processor coupled to the output terminal which receives and analyzes the operational information regarding operating conditions which contributed to the first failure.

14. The first failure management system in accordance with claim 1, wherein the electronic device comprises a computer system, and the storage stores information regarding current and past operating conditions of the computer system.

15. The first failure management system in accordance with claim 1, wherein the electronic device comprises hardware consisting essentially of an integrated circuit.

16. A method of identifying a first failure condition in a computer system having a plurality of devices interconnected by a bus, the method comprising:
   (a) using a storage which is dedicated to the failure identification method to store information regarding operating conditions of the computer system;
   (b) updating the information in the storage;
   (c) identifying a first failure in a device of the computer system; and
   (d) interrupting the updating of information when a first failure is identified so that information regarding operating conditions which contributed to the first failure is retained in the storage.

17. The method in accordance with claim 16 wherein the storage comprises a register.

18. The method in accordance with claim 16 wherein the computer system comprises a memory and the storage comprises selected locations in the memory.

19. The method in accordance with claim 16, wherein step (b) comprises periodically updating information in the storage.

20. The method in accordance with claim 16 wherein step (b) comprises updating information in the storage upon the occurrence of a predetermined event.

21. The method in accordance with claim 16, wherein the computer system further includes a plurality of registers which hold computer system state information and wherein step (b) comprises transferring the state information from the registers to the storage.

22. The method in accordance with claim 21 wherein the storage comprises a shadow register and step (b) comprises transferring the state information from the registers to the shadow register.

23. The method in accordance with claim 21, wherein step (b) comprises transferring information from a plurality of device register files to the storage.

24. The method in accordance with claim 21, wherein step (b) comprises transferring information from a system bus information file to the storage.

25. The method in accordance with claim 21 wherein step (d) comprises interrupting transfer of the state information from the registers to the storage when a failure is detected.

26. The method in accordance with claim 16, wherein the computer system has a plurality of storages, each holding operating information including an error indicating flag, and wherein step (c) comprises generating a first failure indicating signal in response to the error indicating flags.

27. The method in accordance with claim 16, further including reading information regarding operating conditions which contributed to the first failure from the storage to an output terminal.

28. The method in accordance with claim 27, further including receiving and analyzing the operational information regarding operating conditions which contributed to the first failure in a service processor connected to the output terminal.

29. The method in accordance with claim 16 wherein the storage stores information regarding current and past operating conditions of the computer system.

30. A computer system having a plurality of devices interconnected by a bus, the devices being subject to failures, the computer system comprising:
- a storage dedicated to the management system which stores information regarding operating conditions of each of the plurality of devices;
- an updater which continually updates the information in the storage;
- an identifier which identifies a first failure in a device of the computer system; and
- a capture mechanism which responds to a first failure identified by the identifier by interrupting the updating of information so that information regarding operating conditions which contributed to the first failure is retained in the storage.

31. The computer system in accordance with claim 30 wherein the storage stores information regarding current operating conditions of the plurality of devices.

32. The computer system in accordance with claim 30 wherein the storage stores information including a history of operating conditions of the plurality of devices.

* * * * *